Figure 1:
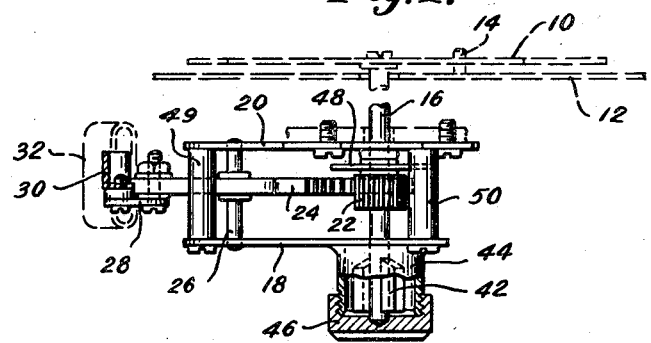

Feb. 15, 1955     A. S. BROWN     2,701,968

PRESSURE GAUGE

Filed Sept. 7, 1950

Inventor,
Arthur S. Brown,
by W. R. Hulbert
Att'y.

United States Patent Office 2,701,968
Patented Feb. 15, 1955

2,701,968

PRESSURE GAUGE

Arthur S. Brown, Webster, Mass., assignor, by mesne assignments, to Acragage Corporation, Milford, Conn., a corporation of Massachusetts Application September 7, 1950, Serial No. 183,639

4 Claims. (Cl. 73—414)

This invention relates to pressure gages in which motion of the Bourdon tube tip or other actuating element involving relatively high order energy changes and considerable forces is transmitted through a mechanical train to a pointer assembly, the corresponding motion of which involves relatively small order energy changes. More particularly it is concerned with new and improved means for isolating the relatively delicate pointer assembly from the effects of sudden violent movements of the actuating element without sacrificing the sensitivity and reliability of the device, both to prevent damage to the instrument and to eliminate whipping back and forth of the pointer.

The Bourdon tube of a pressure gage is usually connected to a pointer through a mechanical train of levers or gears so that motion of the tube tip, responsive to fluctuations in the line pressure, may be indicated or recorded on a suitable scale without any lost motion. Where such instruments are used on pulsating pressure systems or on systems subject to sudden release or increase of pressure, they are prone to rapid wear and mechanical breakage. Most pressure gage damage has been caused by pulsating pressures or by sudden pressure releases, the former introducing extreme wear on the moving parts and the latter causing mechanical damage, generally by slamming the indicating pointer against a mechanical stop at the zero end of the scale.

So far as I am aware, while the gage art has progressed satisfactorily in developing rugged and long-life movements of new materials and construction better to withstand the violent strains just described, the same progress has not attended efforts to eliminate altogether pointer whip and corresponding wearing of the gage movements. Damping devices for this purpose have usually taken the form of restricted orifices in the fluid pressure line to the gage or of fluid damping attachments directly connected to the Bourdon tube or other prime actuating element in the gage. Such damping devices have generally been most unsuccessful, since orifices are susceptible to plugging in service and the size of the openings must be adapted to conform to the specific fluid and fluid viscosity in the line, and so far as the damping of the motion of the Bourdon tube tip is concerned, if the damping means is sufficiently strong to protect the instrument, the instrument then becomes so sluggish in response to pressure changes as to be inaccurate and unusable in many cases. If such damping device be weakened in order to provide greater sensitivity, then its damping effect becomes practically nil.

I have found that the foregoing difficulties may readily be overcome by the novel conception of the present invention, one of the principal objects of which is to provide a pressure gage which will be sensitive to the slightest changes in increase in pressure and will be highly sensitive to the slightest changes in decreasing pressure, provided that such decrease continues for a very brief interval but from which needle whip and excessive wear of the movement are substantially eliminated.

Another object of the invention is to provide means for isolating the pointer assembly of a pressure gage from the effects of sudden motion of the Bourdon tube or other actuating element in one direction without interfering with its proper indicating function in either direction.

Still another object of the invention is to provide a new and improved pressure gage which may be used on systems subject to rapidly varying or pulsating pressures in which the pointer will yield a steady reading reasonably close to the peak pressures encountered.

A further object of the invention is to provide an improved pressure gage for use on a pulsating system which will yield close to a mean flow reading, flow being a square root function of pressure.

Still another object of the invention is to provide damping and biasing means for the pointer assembly of a pressure gage having a high energy actuating element for preventing whipping of the pointer, while leaving the high energy element to fluctuate freely without impairing significantly the efficiency or sensitivity of the device.

Still a further object of the invention is to provide a new and improved pressure gage for use with fluctuating pressure systems which is characterized by its long wearing qualities, simplicity and ruggedness.

I have accomplished these objects by the provision in a pressure gage in which motion of the Bourdon tube or other actuating element involving relatively high order energy changes is transmitted through a mechanical train to a pointer assembly the corresponding motion of which involves relatively small order energy changes, of means for isolating the pointer assembly, without otherwise interfering with its operation, from the effects of sudden violent movements of the actuating element in one direction. The invention is featured by the provision, in combination, of a coupling member constituting a part of the mechanical train, this member furnishing a solid mechanical link in one direction for driving the pointer around but permitting free motion of the actuating element, uncoupled from the pointer, in the other direction, weak biasing means associated with the pointer assembly to cause the pointer to follow the free motion of the actuating element, and damping means also associated with the pointer assembly for retarding the following movement thereof to such a slow speed as to permit ready legibility and to cause the device to read close to the maxima of rapidly pulsating systems.

In one specific embodiment of the invention as applied to a pressure gage having a Bourdon tube, I couple the tip of the Bourdon tube to the sector of an ordinary gage movement by means of a slotted link which, upon increase in pressure, drives the pointer around without the slightest delay, but which, upon a sudden decrease of pressure, permits free motion of the tube tip without affecting the pointer. In this case the pointer is biased by means of a weak hair spring in the direction of its zero position and the motion of the pointer responsive to the spring is damped by the revolving of a paddle wheel attached to its shaft and immersed in oil in a dash pot.

Figure 2:
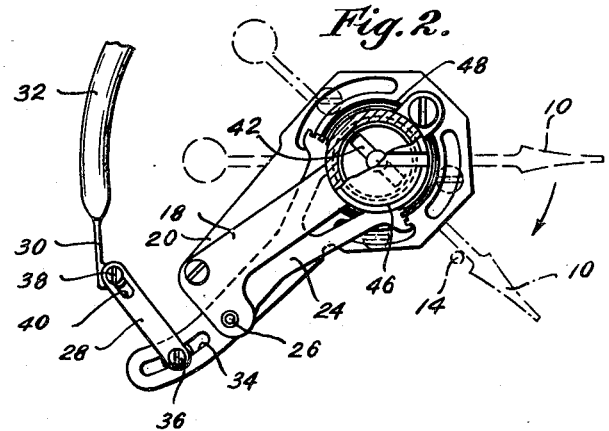

The foregoing and other objects, advantages and features of the invention will become apparent from the following detailed description of a preferred embodiment thereof taken in connection with the accompanying drawings in which like numerals refer to like parts in the several views and in which:

Fig. 1 is a plan view, partly in section, of a pressure gage movement embodying the invention; and Fig. 2 is a rear view of the same with portions of the dash pot broken away.

As shown diagrammatically, the pointer 10 is arranged to revolve in front of a dial plate 12 and is stopped at its zero position by a pin 14. The pointer 10 is affixed to a shaft 16 rotatably journalled in a pair of plates 18 and 20 held in spaced relation by a pair of posts 49 and 50. The shaft 16 carries pinion 22 which engages the teeth of the sector 24 which is in turn pivoted on an axle 26 held in the plates 18 and 20. The sector 24 is linked at its end opposite the gear teeth by means of a slotted link 28 to the tip 30 of the Bourdon tube 32. The sector 24 is optionally slotted at 34 to permit adjustment of the degree of mechanical advantage of the system and to permit zero adjustment. When adjustment is completed, the sector is clamped to the link 28 by a bolt 36.

The bolt 38 which connects the Bourdon tube to the link 28 rides in a slot 40 of the link and functions in a manner which will be hereinafter more completely explained.

Now returning to the movement, the shaft 16 extends beyond the pinion 22 through bearings in the plate 18 and terminates in a paddle wheel 42 adapted to rotate in a dash pot 44. The dash pot constitutes a metal or plastic cylinder closed by a cover 46 and is adapted to contain a high viscosity oil for braking the rotation of the paddle. A hair spring 48 is connected between the stationary post 50 and the pointer shaft 16 to bias the latter for rotation in the zero direction of the pointer 10.

The operation of the novel gage mechanism of the invention is as follows: Upon increase of pressure and corresponding movement of the tip 30, the link 28 pulls the sector 24 and pinion 22 to maximum pressure indication, but upon rapid pressure decrease the tip 30 returns uncoupled from the movement because of the slot 40. A pulsating pressure will cause the tube tip 30 to ride back and forth in the slot 40 in the link. However, should the pressure drop and remain so for a few seconds, the indicated pressure will drop correspondingly since the hair spring 48 will have sufficient time to rotate the pointer shaft in a direction following the motion of the Bourdon tube and causing the sector and link to overtake the tube tip.

Preferably I employ a silicone oil in the dash pot, since it has a flat temperature-viscosity curve and is therefore unaffected by atmospheric temperature changes. By providing a slot 40 of sufficient length to accommodate the full travel of the Bourdon tube tip from zero to maximum scale reading, the gage will stand any and all kinds of sudden pressure releases with absolutely no jar or strain on the pointer or the movement. Furthermore, due to the novel arrangement of the parts, it is only necessary to provide a dash pot of sufficient size and strength to absorb the relatively small energy of the hair spring, thereby permitting the use of small, compact and inexpensive parts and eliminating any interference with the sensitivity of pressure indication. The dimensions and characteristics of the dash pot and paddle are so chosen as to balance the constant spring rate of the hair spring, thus providing a construction completely independent of the amount of surge, or the violence or speed of the fluctuations of the tip 30 of the Bourdon tube 32.

It will be observed that one of the principal advantages of my novel device is that, unlike prior art dampeners which tend to maintain the pointer approximately at the average pressure of pulsation, it tends to hold the indicated pressure close to the maximum amount of surge, which is the pressure that the gage user is usually most interested in. I have found that in actual service the improved gage of the invention will give a reading in most pulsating systems of approximately 80% of the maximum pressure of the surge range. This is in marked contrast to the ordinary prior art dampened gages which, operating, for example, on a system pulsating from 10 to 20 pounds per square inch, will hold the needle at about 15 lbs. Under similar conditions the gage of the present invention will tend to hold the pointer at 19 pounds, or within one pound of the maximum. On the other hand if the maximum pressure of the surge is 100 pounds and the low end of the surge is zero the gage of the invention will indicate 80 pounds pressure while the prior art dampened gage would read 50 pounds.

Another advantage of the novel gage of the invention is its adaptability to indicate flow availability. Flow is a square root function of pressure, and, therefore, the mean point on a flow curve is approximately 70% of the maximum rather than 50% of the maximum. Therefore a gage equipped with dampening means of the invention operating at 80% of the maximum under pulsating conditions gives very close to a true mean flow reading.

By mounting the damping means on the pointer assembly and isolating the same from the actuating element, the sensitivity of the instrument is preserved because the forces involved are relatively small and the parts may be simple and cheap to construct.

While I have described and illustrated a preferred embodiment of the invention as applied to fluid pressure gages, it is evident that various changes and modifications of the same will occur to those skilled in the art within the spirit and scope of the invention as defined in the appended claims.

I claim:

1. In a pressure gage in which motion of an actuating element such as a Bourdon tube involving relatively high order energy changes and considerable forces is transmitted through a mechanical train to a pointer assembly the corresponding motion of which involves relatively small order energy changes, means for isolating the pointer assembly from the effect of sudden violent movements of said actuating element in one direction which comprises, in combination: a coupling member in said mechanical train, said coupling member furnishing a solid mechanical link in one direction for driving said pointer responsive to the motion of said actuating element and permitting free motion of said actuating element, uncoupled from said pointer, in the other direction, weak spring biasing means associated with said pointer assembly to cause said pointer to follow the free motion of said actuating element, and fluid damping means also associated with said pointer assembly for retarding said following movement, said damping means balancing said spring biasing means whereby said pointer at any instant will yield a reading close to the maximum movement of said actuating element in its driving direction.

2. In a pressure gage in which motion of the tip of a Bourdon tube involving relatively high order energy changes and considerable forces is transmitted through a mechanical train to a pointer assembly the corresponding motion of which involves relatively small order energy changes, means for isolating the pointer assembly from the effect of sudden violent movements of said tube tip in one direction which comprises, in combination: a coupling member in said mechanical train, said coupling member furnishing a solid mechanical link in one direction for driving said pointer responsive to the motion of said tube tip and permitting free motion of said tube tip, uncoupled from said pointer, in the other direction, a hair spring connected to said pointer assembly to cause the pointer to follow the free motion of said tube tip, and a fluid brake associated with said pointer assembly for retarding said following movement, said fluid brake balancing said spring whereby said pointer at any instant will yield a reading close to the maximum movement of said tube tip in its driving direction.

3. In a pressure gage in which motion of the tip of a Bourdon tube involving relatively high order energy changes and considerable force is transmitted through a movement to a pointer mounted on a shaft the corresponding motion of said movement and pointer involving relatively small order energy changes, means for isolating the pointer and movement from the effect of sudden violent motion of said tube tip in one direction which comprises, in combination: a coupling element linking said tube tip to said movement, said coupling element furnishing a solid mechanical link in one direction for driving said pointer responsive to motion of said tip and permitting free motion of said tube tip, uncoupled from said pointer, in the other direction, a hair spring biasing said pointer to follow the free motion of said tube tip, and a fluid brake associated with said shaft for retarding said following movement, said fluid brake balancing said spring whereby said pointer at any instant will yield a reading close to the maximum movement of said tube tip in its driving direction.

4. In a pressure gage the combination which comprises a Bourdon tube, a movement, a slotted link linking the tip of said tube to said movement for driving said movement in one direction only responsive to motion of said tube tip and permitting free motion of said tube tip, uncoupled from said movement, in the other direction, a pointer and pointer shaft driven by said movement, a hair spring biasing said pointer, shaft and movement to follow the free motion of said tube tip, a paddle held on said shaft to rotate therewith and a dash pot surrounding said paddle, said dash pot and paddle serving to damp the following motion of said pointer, shaft and movement, the dimensions and characteristics of said dash pot and paddle being so chosen as to balance said spring whereby said pointer at any instant will yield a reading close to the maximum movement of said tube tip in its driving direction.

References Cited in the file of this patent

UNITED STATES PATENTS

| | | |
|---|---|---|
| 520,964 | Knowles | June 5, 1894 |
| 523,404 | Meady | July 24, 1894 |
| 619,734 | Duncan | Feb. 21, 1899 |
| 786,696 | Vreeland | Apr. 4, 1905 |
| 1,565,447 | Heise | Dec. 15, 1925 |
| 1,939,466 | Ruopp | Dec. 12, 1933 |
| 2,223,579 | Ruopp | Dec. 3, 1940 |
| 2,382,082 | McGregor et al. | Aug. 14, 1945 |

FOREIGN PATENTS

| | | |
|---|---|---|
| 243,387 | Great Britain | July 15, 1926 |
| 681,521 | France | Feb. 3, 1930 |
| 451,280 | Great Britain | Aug. 4, 1936 |